United States Patent
Qian et al.

(10) Patent No.: US 7,956,737 B2
(45) Date of Patent: Jun. 7, 2011

(54) METHOD AND APPARATUS FOR NETWORK SERVICE ASSURANCE

(75) Inventors: Zhiqiang Qian, Holmdel, NJ (US);
I-Cheng Steve Hsu, Holmdel, NJ (US);
Lori Keighron, Rumson, NJ (US);
Jackson Liu, Middletown, NJ (US);
Daniel McMillan, Red Bank, NJ (US);
Timothy Plattner, Westfield, NJ (US);
Michael John Zinnikas, North Brunswick, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 387 days.

(21) Appl. No.: 12/343,876

(22) Filed: Dec. 24, 2008

(65) Prior Publication Data

US 2010/0156623 A1    Jun. 24, 2010

(51) Int. Cl.
*G08B 23/00* (2006.01)
*G06F 15/173* (2006.01)
*G06F 3/00* (2006.01)

(52) U.S. Cl. .......... 340/517; 340/522; 726/10; 709/223; 709/224; 719/318

(58) Field of Classification Search .................. 340/517
See application file for complete search history.

(56) References Cited

U.S. PATENT DOCUMENTS

| 6,000,045 | A  | * | 12/1999 | Lewis ..................... 714/47.3 |
| 6,131,112 | A  | * | 10/2000 | Lewis et al. .................. 709/207 |
| 6,598,167 | B2 |   | 7/2003  | Devine et al. |
| 2002/0087383 | A1 |   | 7/2002 | Cogger et al. |
| 2003/0041263 | A1 |   | 2/2003 | Devine et al. |
| 2006/0059107 | A1 |   | 3/2006 | Elmore et al. |
| 2006/0092861 | A1 |   | 5/2006 | Corday et al. |
| 2006/0233310 | A1 |   | 10/2006 | Adams, Jr. et al. |
| 2006/0248407 | A1 |   | 11/2006 | Adams, Jr. et al. |
| 2008/0313491 | A1 |   | 12/2008 | Adams, Jr. et al. |

* cited by examiner

*Primary Examiner* — Donnie L Crosland

(57) ABSTRACT

Trouble ticket management automates existing institutional operational processes by engaging various external trouble ticketing systems. These systems feed correlated alarm events, trouble analysis results, and trouble ticket information to a particular institutional network. Correlated alarm feeds, including trouble ticket information, are correlated and sent to institutional trouble ticket management systems. The alarms are processed and remedy tickets are created. The remedy tickets interact with remedy tickets at the institutional trouble ticket management systems. These remedy tickets are bonded with maintenance platform tickets.

20 Claims, 3 Drawing Sheets

METHOD AND APPARATUS FOR NETWORK SERVICE ASSURANCE

BACKGROUND OF THE INVENTION

The present invention relates generally to trouble ticket management systems, and more particularly to trouble ticket management systems in secure environments.

Institutional clients (e.g., government agencies, etc.) of telephone service providers may employ secure, closed, or otherwise restricted networks or portions of networks. In such cases, the institutional client's networks operations center often maintains its own trouble ticket management system (TMS). These TMSs are associated with the secure network and are themselves secure. This does not allow ready access to or coordination with external trouble ticket management systems, such as those used by telephone service providers.

Accordingly, systems and methods for coordinating trouble ticketing management systems are needed.

BRIEF SUMMARY OF THE INVENTION

Coordinating electronic trouble ticketing systems includes receiving circuit information from one or more inventory systems, retrieving a plurality of alarms, correlating the plurality of alarms to the circuit information, determining one or more network problems based on the correlated plurality of alarms related to the circuit information, and transmitting information related to the determined network problems to a user.

In at least one embodiment, retrieving the plurality of alarms includes retrieving one or more physical layer alarms, retrieving one or more data link layer alarms, and retrieving one or more network layer alarms. Correlating the plurality of alarms to the circuit information involves correlating the one or more network layer alarms to the one or more physical layer alarms and the one or more data link layer alarms.

Correlating the one or more network layer alarms to the one or more physical layer alarms and the one or more data link layer alarms includes correlating the one or more network layer alarms to the one or more physical layer alarms and the one or more data link layer alarms by matching the common language facilities identifiers of the one or more network layer alarms to the common language facilities identifiers of the one or more physical layer alarms and to the common language facilities identifiers of the one or more data link layer alarms.

In some embodiments, retrieving the plurality of alarms related to the circuit information includes retrieving the one or more data link layer alarms and the one or more network layer alarms from a global fault platform and retrieving the one or more physical layer alarms from a physical layer platform.

These and other advantages of the invention will be apparent to those of ordinary skill in the art by reference to the following detailed description and the accompanying drawings.

DETAILED DESCRIPTION

The proposed systems and methods of trouble ticket management described herein automate existing institutional operational processes by engaging various external trouble ticketing systems. These systems feed correlated alarm events, trouble analysis results, and trouble ticket information to a particular institutional network. Correlated alarm feeds, including trouble ticket information, are correlated and sent to institutional trouble ticket management systems. The alarms are processed and remedy tickets are created. The remedy tickets interact with remedy tickets at the institutional trouble ticket management systems. In some embodiments, these remedy tickets are bonded with maintenance platform tickets. The institutions may then use the externally created remedy ticket for trouble management and additionally have access to the source tickets, alarms, etc.

Figure 1:
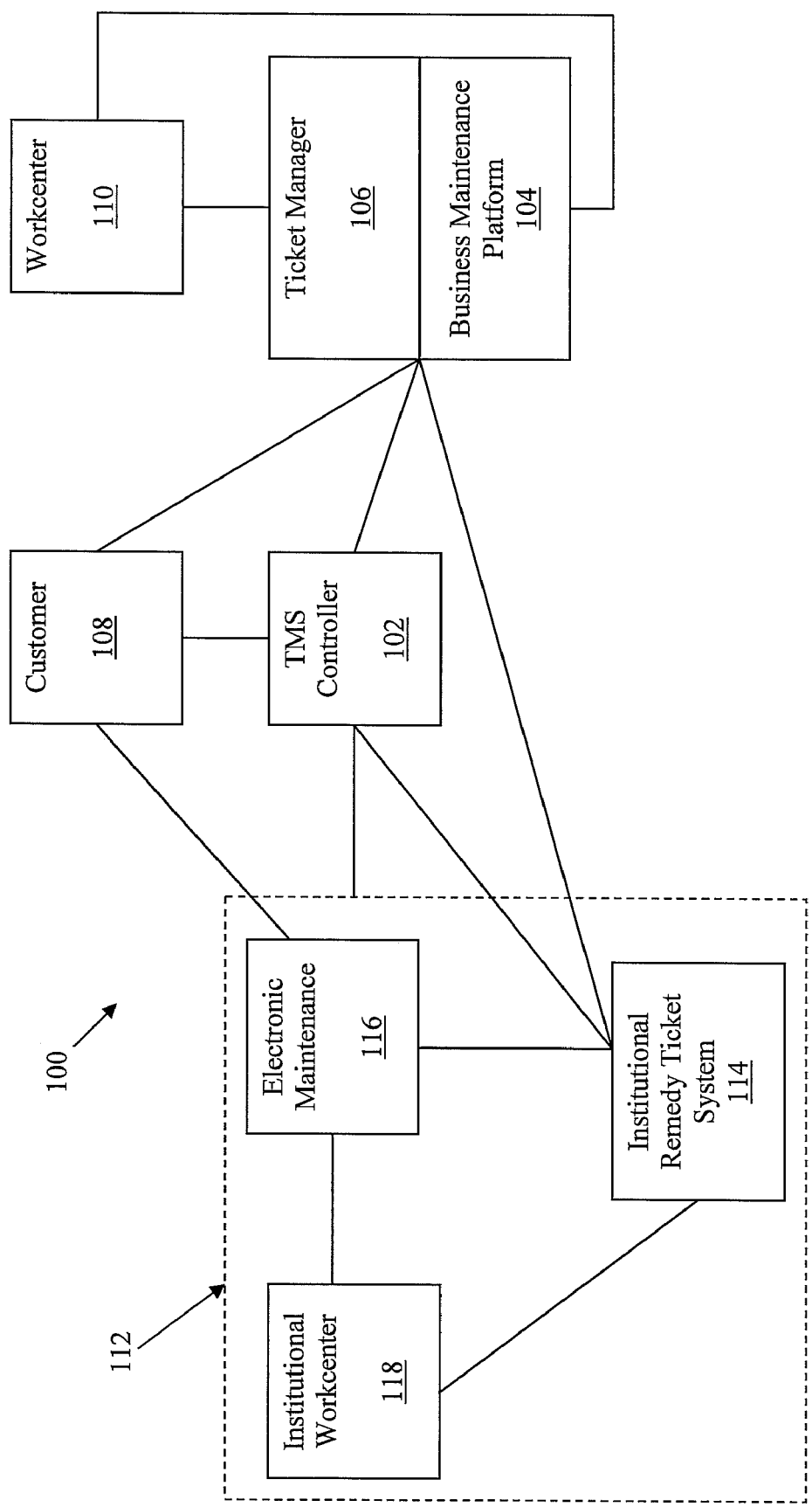
FIG. 1 is a schematic drawing of a trouble ticket management system according to an embodiment of the present invention.

FIG. 1 is a schematic drawing of a global trouble ticket management system (TMS) 100 according to an embodiment of the present invention. Global TMS 100 includes a trouble ticket management system controller 102 in communication with one or more local ticket management systems, such as business maintenance platform 104 and/or ticket manager 106, and one or more customers 108. Business maintenance platform 104 and/or ticket manager 106 may also be coupled to one or more workcenters 110. Additionally, TMS controller 102 is in communication with an institutional network 112 and/or its constituent components.

Institutional network 112 may include an institutional remedy ticket system 114, an electronic maintenance system 116, and/or an institutional workcenter 118, each configured to communicate with one another. In at least one embodiment, electronic maintenance system 116 is also coupled to one or more customers 108.

Figure 3:
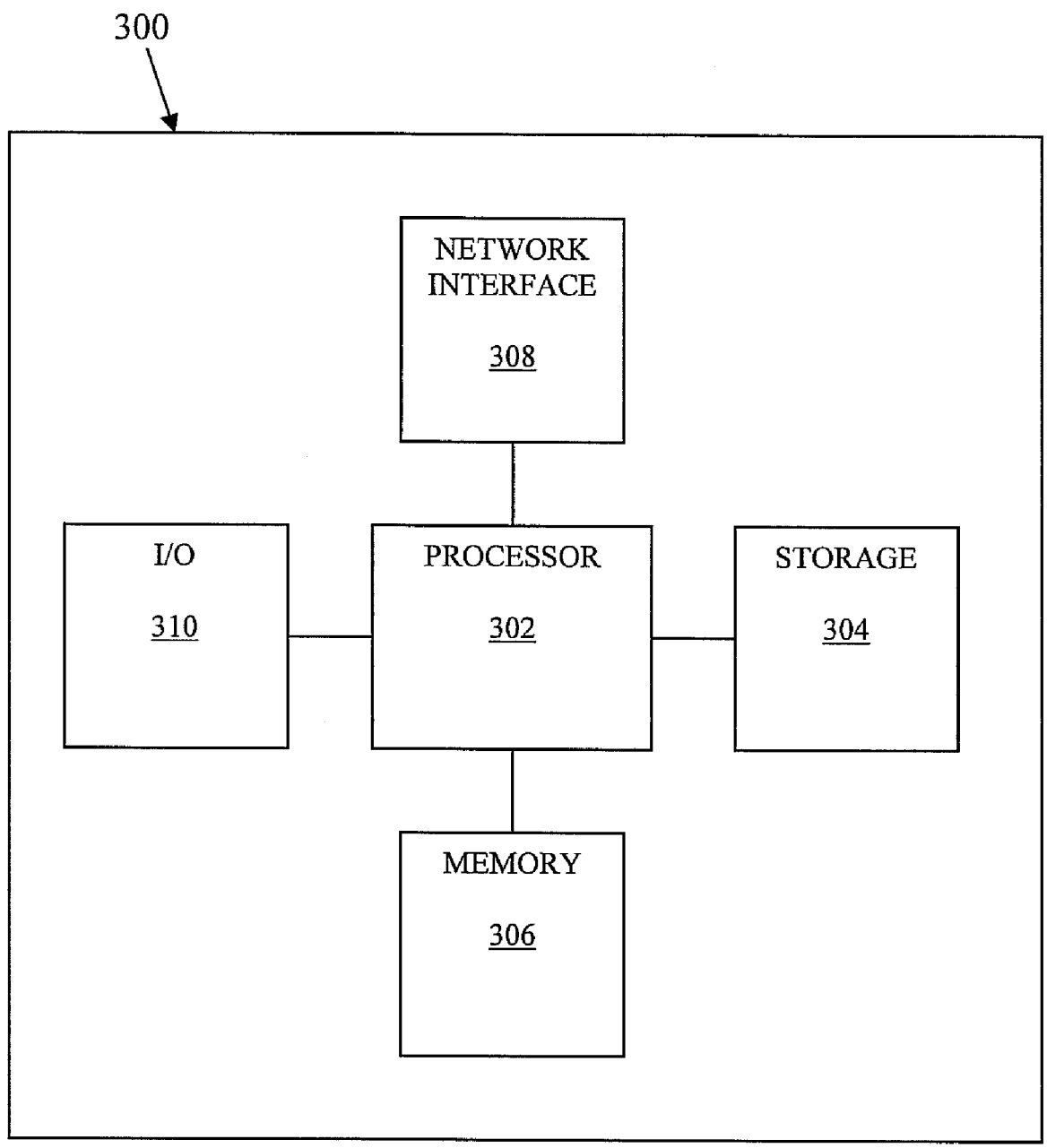
FIG. 3 is a schematic drawing of a computer.

TMS controller 102 may be any appropriate server or controller, such as the controller depicted in FIG. 3. Accordingly, TMS controller 102 is adapted to be configurable (e.g., by an institution, user, client, server, etc.) to coordinate and/or communicate with various alarm systems, communications systems, ticket management systems, and the like to provide any appropriate communication and transfer of information therebetween.

In at least one embodiment, TMS controller 102 is a platform for dynamic generation and management of expert rules that automates critical operations such as customer care, network care, and billing disputes. Such a TMS controller 102 can process hundreds of thousands network alarms, orders, and tickets each day. The TMS controller 102, which adopts the object-oriented design, is more complex than standard servers due to the scale of the associated systems and the dependency amongst rules. Since most of the rules are created manually (e.g., by an institution, user, client, server, etc.) by different "rule managers" across different domains, TMS controller 102 may include a framework for automatic verification and optimization. In these ways, TMS controller 102 may be set-up or otherwise configured to perform various functions of trouble ticket management, as described below in further detail with respect to FIG. 2.

Business maintenance platform 104 may be any appropriate maintenance platform, such as a carrier (e.g., telephone carrier, etc.) maintenance platform. Similarly, ticket manager 106 may be any appropriate carrier ticket manager.

Institutional network 112 may be any communication network used by an institution, organization, government agency, or the like. Generally, institutional network is a closed network including traditional voice telephony components, internet protocol network components, Ethernet components, and/or other similar network components. Institutional network 112 may also include institutional remedy ticket system 114, electronic maintenance system 116, institutional workcenter 118 and/or any other appropriate components for operating a trouble ticket system on the institutional (e.g., local, organizational, etc.) network. Institutional network 112 manages and maintains lists of issues (e.g., alarms, trouble tickets, alerts, etc.) as needed by an organization. Institutional network 112 may include a knowledge base (e.g., actualized as a database) containing information on each customer 108, resolutions to common problems, and other such data.

Components of institutional network 112, such as electronic maintenance system 116 may manage the business logic layer of the application. This layer gives data received from TMS controller 102, ticket manager 106, business maintenance platform 104, and/or customer 108 structure and context, preparing it for use by institutional network 112 and/or any other part of global TMS 100.

In at least one embodiment, institutional network 112 may operate a manual trouble ticket management system. In such a manual system, data are presented to the support technicians at institutional workcenter 118, generally by a software application, web page, or the like. The end-user of the trouble ticket management system (e.g., customer 108) can create entirely new issues, read existing issues, add details to existing issues, or resolve an issue. The institutional network 112 may also record such actions to maintain a history of the actions taken.

Figure 2:
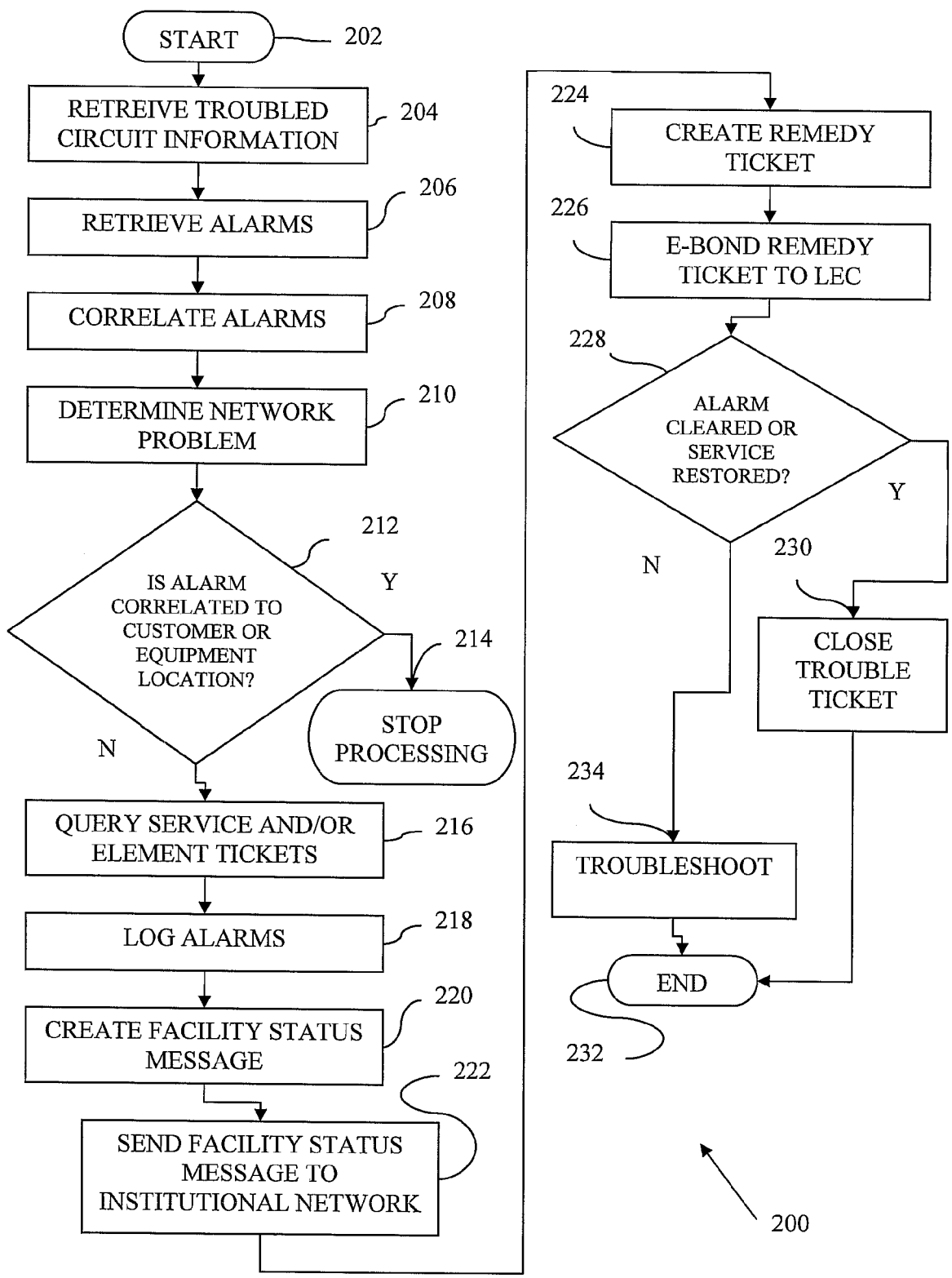
FIG. 2 is a flowchart of a method of trouble ticket management according to an embodiment of the present invention.

FIG. 2 is a flowchart of a method 200 of trouble ticket management according to an embodiment of the present invention. The steps of method 200 may be performed by one or more components of global TMS 100 as described below. The method starts at step 202.

In step 204, troubled circuit information is retrieved from inventory systems. That is, information associated with problems and/or failures in a network are retrieved from one or more sources. In at least one embodiment, the troubled circuit information is retrieved from one or more components of institutional network 112 or another network (e.g., a telephone network, a packet network, etc.).

In step 206, alarms are retrieved. One or more alarms are retrieved from throughout global TMS 100. The alarms may be retrieved at TMS controller 102. Physical layer (e.g., layer 1) alarms may be retrieved from business maintenance platform 104 and/or other platforms in a network such as a common test platform, a network alarm convergent agent, or the like. Data link layer (e.g., layer 2) and/or network layer (e.g., layer 3) alarms may be retrieved from a global fault platform or the like. Of course, other alarms may be retrieved from any location in a packet or telephone network as described above. In some embodiments, retrieval of alarms includes collecting alarm clear events.

In step 208, the alarms are correlated. In at least one embodiment, the alarms are correlated at TMS controller 102. Alarms from different levels may be correlated with each other using any appropriate method. For example, network layer alarms may be correlated to corresponding data link layer and/or physical layer alarms retrieved in step 206. The alarms may be correlated by matching Common Language Facility Identifiers (CLFIs) at various levels. Of course, other correlation methods may be used by TMS controller 102.

In step 210, a network problem is determined. The network problem is determined based on the correlated alarms in step 208. The network problem may be determined by isolating a problem at customer premises equipment (e.g. equipment at customer 108 and/or in institutional network 112), in a local exchange carrier (LEC), in an interexchange carrier (IXC), or in another network, device, or carrier. The isolation may be performed by analyzing outage on a network (e.g., within the purview of global TMS 100). In other words, network and/or data link layer alarms are correlated with physical layer root causes by mapping physical channels to logical channels.

In step 212, a determination is made as to whether an alarm is correlated to a customer (e.g., customer 108) or equipment location (e.g., equipment in a network outside of institutional network 112). Such a determination is based on the determination step 210 above. If an alarm is correlated to a customer or equipment location, the method proceeds to step 214 and processing is stopped since the alarm is not related to institutional network 112.

If an alarm is not correlated to a customer or equipment location, the method proceeds to step 216 and service and/or element tickets are queried. TMS controller 102 queries ticket manage 106 and/or business maintenance platform 106 for service and/or element tickets. In the case of service tickets, the query may be based on a customer circuit identification. In the case of element tickets, the query may be based on a node, shelf, slot, and/or port.

In step 218, the alarms are logged according to a determined fault location. That is, based on the tickets of step 216 and the alarm retrieval of step 206, a determination is made as to where the problem is (e.g., a LEC network outage, a CPE network outage, an IXC network outage, an unknown network outage, etc.). Such information is then logged at TMS controller 102 or another appropriate location.

In step 220, a facility status message is created. In at least one embodiment, the facility status message is a real-time Extensible Markup Language (XML) message with alarm information, circuit identification information, event information, ticket information, and/or other trouble information determined and/or retrieved in the prior method steps.

In step 222, the facility status message is sent to the institutional network 112. Specifically, the facility status message may be sent to the institutional remedy ticket system 114.

A remedy ticket is created at TMS controller 102 in step 224. The remedy ticket may be a trouble and/or remedy ticket that interacts with a trouble and/or remedy ticket used in institutional remedy ticket system 114. In step 226, the remedy ticket is electronically bonded (e-bonded) to the LEC if an LEC problem has been identified.

In step 228, a check is performed to determine if an alarm has been cleared or service is restored. If the alarm has been cleared or service has been restored in the network, the trouble ticket is automatically closed in step 230. The method then ends at step 232. If the alarm has not been cleared or service has not been restored in the network, further troubleshooting may be performed in step 234. Various method steps of method 200 may be repeated or other trouble ticket remedy solutions may be implemented. The method then ends at step 232.

FIG. 3 is a schematic drawing of a controller 300 according to an embodiment of the present invention.

Controller 300 contains devices that form a controller including a processor 302 that controls the overall operation of the controller 300 by executing computer program instructions, which define such operation. The computer program instructions may be stored in a storage device 304 (e.g., magnetic disk, database, etc.) and loaded into memory 306 when execution of the computer program instructions is desired. Thus, applications for performing the herein-described method steps, such as those described above with respect to method 200 are defined by the computer program instructions stored in the memory 306 and/or storage 304 and controlled by the processor 302 executing the computer program instructions. The controller 300 may also include one or more network interfaces 308 for communicating with other devices via a network (e.g., global TMS 100). The controller 300 also includes input/output devices 310 that enable operator interaction with the controller 300. Controller 300 and/or processor 3202 may include one or more central processing units, read only memory (ROM) devices and/or random access memory (RAM) devices. One skilled in the art will recognize that an implementation of an actual computer for use in a portable communication device could contain other components as well, and that the controller of FIG. 3 is a high level representation of some of the components of such a portable communication device for illustrative purposes.

According to some embodiments of the present invention, instructions of a program (e.g., controller software) may be read into memory 306, such as from a ROM device to a RAM device or from a LAN adapter to a RAM device. Execution of sequences of the instructions in the program may cause the controller 300 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 306 may store the software for the controller 300, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general-purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general-purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for coordinating electronic trouble ticketing systems comprising:
   receiving circuit information from one or more inventory systems;
   retrieving a plurality of alarms;
   correlating the plurality of alarms to the circuit information;
   determining one or more network problems based on the correlated plurality of alarms related to the circuit information; and
   transmitting information related to the determined network problems to a user.

2. The method of claim 1 wherein retrieving the plurality of alarms comprises:
   retrieving one or more physical layer alarms;
   retrieving one or more data link layer alarms; and
   retrieving one or more network layer alarms.

3. The method of claim 2 wherein correlating the plurality of alarms to the circuit information comprises:
   correlating the one or more network layer alarms to the one or more physical layer alarms and the one or more data link layer alarms.

4. The method of claim 3 wherein correlating the one or more network layer alarms to the one or more physical layer alarms and the one or more data link layer alarms comprises:
   correlating the one or more network layer alarms to the one or more physical layer alarms and the one or more data link layer alarms by matching the common language facilities identifiers of the one or more network layer alarms to the common language facilities identifiers of the one or more physical layer alarms and to the common language facilities identifiers of the one or more data link layer alarms.

5. The method of claim 2 wherein retrieving the plurality of alarms related to the circuit information comprises:
   retrieving the one or more data link layer alarms and the one or more network layer alarms from a global fault platform; and
   retrieving the one or more physical layer alarms from a physical layer platform.

6. The method of claim 4 further comprising:
   creating a facility status message; and
   transmitting the facility status message to the user.

7. The method of claim 6 wherein the facility status message comprises information associated with the plurality of alarms.

8. A system for coordinating electronic trouble ticketing systems comprising:
   one or more inventory systems;
   an institutional trouble ticketing system;
   a global trouble ticketing system coupled to the one or more inventory systems and the institutional trouble ticketing system; and
   a trouble ticket management system controller configured to:
      receive circuit information from the one or more inventory systems;
      retrieve a plurality of alarms;
      correlate the plurality of alarms to the circuit information;
      determine one or more network problems based on the correlated plurality of alarms related to the circuit information; and
      transmit information related to the determined network problems to the institutional trouble ticketing system.

9. The system of claim 8 wherein the controller is further configured to:
   retrieve one or more physical layer alarms;
   retrieve one or more data link layer alarms; and
   retrieve one or more network layer alarms.

10. The system of claim 9 wherein the controller is further configured to:

correlate the one or more network layer alarms to the one or more physical layer alarms and the one or more data link layer alarms.

11. The system of claim 10 wherein the controller is further configured to:
correlate the one or more network layer alarms to the one or more physical layer alarms and the one or more data link layer alarms by matching the common language facilities identifiers of the one or more network layer alarms to the common language facilities identifiers of the one or more physical layer alarms and to the common language facilities identifiers of the one or more data link layer alarms.

12. The system of claim 9 wherein the controller is further configured to:
retrieve the one or more data link layer alarms and the one or more network layer alarms from a global platform; and
retrieve the one or more physical layer alarms from a physical layer platform.

13. The system of claim 11 wherein the controller is further configured to:
create a facility status message; and
transmit the facility status message to the institutional trouble ticketing system.

14. The system of claim 13 wherein the facility status message comprises information associated with the plurality of alarms.

15. A computer readable medium comprising computer program instructions capable of being executed in a processor and defining the steps of:
receiving circuit information from one or more inventory systems;
retrieving a plurality of alarms;
correlating the plurality of alarms to the circuit information;
determining one or more network problems based on the correlated plurality of alarms related to the circuit information; and
transmitting information related to the determined network problems to a user.

16. The computer readable medium of claim 15 wherein the instructions for retrieving the plurality of alarms further define the steps of:
retrieving one or more physical layer alarms;
retrieving one or more data link layer alarms; and
retrieving one or more network layer alarms.

17. The computer readable medium of claim 16 wherein the instructions for correlating the plurality of alarms to the circuit information further define the steps of:
correlating the one or more network layer alarms to the one or more physical layer alarms and the one or more data link layer alarms.

18. The computer readable medium of claim 17 wherein the instructions for correlating the one or more network layer alarms to the one or more physical layer alarms and the one or more data link layer alarms further defines the step of:
correlating the one or more network layer alarms to the one or more physical layer alarms and the one or more data link layer alarms by matching the common language facilities identifiers of the one or more network layer alarms to the common language facilities identifiers of the one or more physical layer alarms and to the common language facilities identifiers of the one or more data link layer alarms.

19. The computer readable medium of claim 16 wherein the instructions for retrieving the plurality of alarms related to the circuit information further define the steps of:
retrieving the one or more data link layer alarms and the one or more network layer alarms from a global fault platform; and
retrieving the one or more physical layer alarms from a physical layer platform.

20. The computer readable medium of claim of claim 18 further comprising instructions for:
creating a facility status message; and
transmitting the facility status message to the user.

* * * * *